(12) United States Patent
Ikehara et al.

(10) Patent No.: US 10,712,502 B2
(45) Date of Patent: Jul. 14, 2020

(54) PROBE FOR OPTICAL MEASUREMENT AND METHOD OF PRODUCING THE SAME

(71) Applicant: Shimadzu Corporation, Kyoto (JP)

(72) Inventors: Tatsuya Ikehara, Kyoto (JP); Naohiro Kamiya, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 0 days.

(21) Appl. No.: 16/368,256

(22) Filed: Mar. 28, 2019

(65) Prior Publication Data

US 2019/0302372 A1   Oct. 3, 2019

(30) Foreign Application Priority Data

Mar. 30, 2018 (JP) .................. 2018-067637
Mar. 26, 2019 (JP) .................. 2019-058286

(51) Int. Cl.
*G02B 6/36* (2006.01)
*G01N 21/85* (2006.01)

(52) U.S. Cl.
CPC ....... *G02B 6/3624* (2013.01); *G01N 21/8507* (2013.01)

(58) Field of Classification Search
CPC .......................... G02B 6/3624; G01N 21/8507
See application file for complete search history.

(56) References Cited

U.S. PATENT DOCUMENTS

2017/0139155 A1* 5/2017 Tong ................... G02B 6/3861

FOREIGN PATENT DOCUMENTS

JP   2016-138913 A   8/2016
JP   2016-200647 A   12/2016

OTHER PUBLICATIONS

European Search Report dated Jul. 10, 2019 for the corresponding European Patent Application No. 19165729.5.

* cited by examiner

*Primary Examiner* — Ryan A Lepisto
(74) *Attorney, Agent, or Firm* — Muir Patent Law, PLLC

(57) ABSTRACT

A probe for optical measurement is provided with an optical fiber, a ferrule in which an optical fiber is inserted such that one end of the optical fiber is exposed from one end of the ferrule and the other end side of the optical fiber is exposed from the other end of the ferrule, a cylindrical body sleeve having non-flexibility in which at least a part of the other end side of the ferrule is inserted, the body sleeve covering a part of the other end side of the optical fiber, and an optical fiber fixture filled in a gap between the optical fiber and the body sleeve and composed of a member formed by solidification of a material having fluidity.

5 Claims, 4 Drawing Sheets

PROBE FOR OPTICAL MEASUREMENT AND METHOD OF PRODUCING THE SAME

TECHNICAL FIELD

The present invention relates to a probe for optical measurement used for measuring concentration, density, partial pressure, molecular species, etc. (hereinafter collectively referred to as "concentration, etc.") of a measurement target gas using a laser absorption spectroscopic method, and also relates to a method of producing the probe for optical measurement.

BACKGROUND ART

As a method of measuring concentration, etc., of a target gas contained in a measurement target gas, an absorption spectroscopic method is known. In an absorption spectroscopic method, measurement light in the absorption wavelength band of a target gas is irradiated to a measurement target gas, and the intensity of the transmitted light is measured. Then, the absorbance of the target gas is obtained from the light absorption amount by the target gas, and the concentration, etc., of the target gas is obtained from the absorbance.

Such an absorption spectroscopic method is used for measuring concentration, etc., of, for example, oxygen contained in a combustion gas supplied to an engine of an automobile, carbon dioxide contained in an exhaust gas from an engine. In this case, in order to perform the measurement in real time with the engine actually running, a probe is inserted into the combustion chamber of the engine or into the exhaust gas pipe, and the tip of the optical fiber is fixed at a predetermined position for the measurement. Such a probe is also used for measuring concentration, etc., of a gas in a flow path in a fuel cell or in a living body.

In Patent Document 1, a probe for optical measurement having a ferrule for fixing a tip of an optical fiber is described. In this probe for optical measurement, an optical fiber is inserted into a ferrule so that the tip of the optical fiber is taken out from the tip of the ferrule, and the periphery of the ferrule and the periphery of the portion of the optical fiber on the rear end side (the opposite side of the tip) than the ferrule are covered by a body sleeve formed of a metal tube. There is a gap between the optical fiber and the body sleeve on the rear end side than the ferrule, and a flexible protective tube is inserted in the gap. At the time of measurement, the tip of the probe for optical measurement is inserted into a hole provided in a combustion chamber of an engine, an exhaust gas pipe, etc., and the probe for optical measurement is fixed. With this, the tip of the optical fiber is fixed at a predetermined position in the combustion chamber or the exhaust gas pipe. According to this probe for optical measurement, the optical fiber is covered with the flexible protective tube on the rear end side than the ferrule. This prevents disconnection of the optical fiber due to bending.

PRIOR ART

Patent Document

Patent Document 1: Japanese Unexamined Patent Application Publication No. 2016-200647

SUMMARY OF THE INVENTION

Problems to be Solved by the Invention

For the purpose of preventing an operation of an engine or emission of an exhaust gas from being affected, it is necessary to make a hole for inserting an optical measurement probe to be provided in a measurement target portion such as a combustion chamber of an engine and an exhaust gas pipe as small as possible. However, in the probe for optical measurement described in Patent Document 1, the diameter of the portion of the probe to be inserted into such a hole is determined by the diameter of the body sleeve and the protective tube is inserted in the hole. Therefore, it is difficult to further reduce the diameter of the body sleeve.

It is an object of the present invention to provide a probe for optical measurement capable of reducing a diameter of the probe while preventing disconnection of an optical fiber and also provide a method of producing such a probe.

Means for Solving the Problems

A probe for optical measurement according to the present invention which has been made to solve the aforementioned objects, includes:

at least one optical fiber;

a ferrule in which the optical fiber is inserted such that one end of the optical fiber is exposed from one end of the ferrule and the other end side of the optical fiber is exposed from the other end of the ferrule;

a cylindrical body sleeve having non-flexibility in which a part of at least the other end side of the ferrule is inserted, wherein the body sleeve covers a part of the other end side of the optical fiber; and an optical fiber fixture filled in a gap between the optical fiber and the body sleeve and composed of a member formed by solidification of a material having fluidity.

In the probe for optical measurement according to the present invention, an optical fiber is inserted in the ferrule, and at least a part of the other end side of the ferrule is inserted in the body sleeve. Further, the other end side portion of the optical fiber exposed from the ferrule is covered with the body sleeve. Thus, on the other end side of the optical fiber, a gap is formed between the optical fiber and the body sleeve. The optical fiber fixture is filled in this gap. Such an optical fiber fixture can be produced by filling a material having fluidity in the gap and solidifying the material even in cases where the gap between the optical fiber and the body sleeve is small. For this reason, the diameter of the body sleeve can be reduced. With this, the diameter of the probe for optical measurement can be reduced.

Also, the optical fiber fixture formed of a solidified adhesive agent is provided outside the optical fiber and the body sleeve having non-flexibility is provided outside the optical fiber fixture. Therefore, disconnection of the optical fiber can also be prevented.

For the one formed by solidification of a material having fluidity, it is possible to use one solidified due to evaporation of a solvent, one solidified due to a chemical reaction between a main agent and a curing agent, and one solidified due to a chemical reaction by heat or light (e.g., a thermosetting resin, a light-curable resin). For the material, an adhesive agent can be suitably used.

For the one formed by solidification of a material having fluidity, it is preferable to use one having a low coefficient of thermal expansion, and more preferable to use one formed by solidification of an adhesive agents, such as, e.g., a silicone based adhesive agent and an epoxy based adhesive agent. Note that the mechanical strength of the probe for optical measurement is secured by the body sleeve having non-flexibility. Therefore, no mechanical strength is required for the optical fiber fixture.

For the material of the body sleeve, metal, ceramics, etc., can be used. For the material of the ferrule, ceramics, glass, metal, etc., can be used.

The probe for optical measurement according to the present invention is preferably provided with a plurality of optical fibers. For example, the probe for optical measurement may be provided with two optical fibers, wherein one of the optical fibers is used for irradiating irradiation light and the other is used for detecting absorbed light. Alternatively, the probe for optical measurement may be provided with two, three or more optical fibers to measure the absorption of light at different wavelengths for each optical fiber.

In the probe for optical measurement according to the present invention, the portion of the optical fiber positioned on the other end side than the body sleeve may be covered with a protective tube having flexibility. With this, it is possible to prevent disconnection of the optical fiber due to bending on the other end side than the body sleeve. Note that by not inserting the other end side of the probe for optical measurement than the body sleeve into the hole provided in a measurement target portion, even in cases where the diameter of the probe for optical measurement is increased by the protective tube on the other end side than the body sleeve, measurement can be performed with no problem.

In the probe for optical measurement according to the present invention, it may be configured such that the body sleeve is provided with a hole filled with the one formed by solidification of a material having fluidity at a position covering a part of the other end side of the optical fiber. Such a hole filled with the one formed by solidification of a material having fluidity is formed in the probe for optical measurement according to the present invention when produced by the method of producing the probe for optical measurement according to the present invention described below.

A method of producing a probe for optical measurement, comprising:

providing a hole in a cylindrical body sleeve having non-flexibility;

inserting an optical fiber in a ferrule such that one end of the optical fiber is exposed from one end of the ferrule and the other end side of the optical fiber is exposed from the other end of the ferrule;

inserting the ferrule into the body sleeve such that the body sleeve covers a part of the other end side of the optical fiber and the hole is positioned at a position which covers a part of the other end side of the optical fiber;

filling a material in a gap between the optical fiber and the body sleeve by sucking a gas from the hole while injecting the material having fluidity from an end portion of the body sleeve on the other end side of the optical fiber; and solidifying the material in the gap and the hole.

As the material, an adhesive agent may be suitably used.

According to the method of producing a probe for optical measurement, it is possible to easily fill a material having fluidity in the gap between the optical fiber and the body sleeve. This makes it possible to reduce this gap, which in turn can reduce the diameter of the probe for optical measurement.

Effects of the Invention

According to the probe for optical measurement and the method of producing the same, the diameter of the probe for optical measurement can be reduced while preventing disconnection of an optical fiber.

EMBODIMENTS FOR CARRYING OUT THE INVENTION

With reference to FIG. 1 to FIG. 6, embodiments of a probe for optical measurement according to the present invention and its production method will be described.

Figure 1:
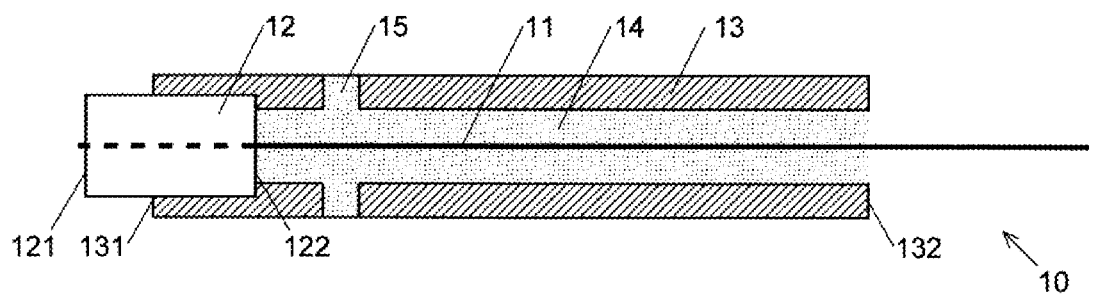
FIG. 1 is a schematic configuration view showing one embodiment of a probe for optical measurement according to the present invention.

FIG. 1 is a schematic configuration view showing a probe 10 for optical measurement according to this embodiment. This probe 10 for optical measurement is provided with an optical fiber 11, a ferrule 12, a body sleeve 13, and an optical fiber fixture 14.

The ferrule 12 is a columnar member made of zirconia, and is provided with a through-hole for inserting the optical fiber 11 along the axis of the columnar member. In FIG. 1, a schematic configuration of the probe 10 for optical measurement is shown as a cross-sectional view taken along a plane parallel to the axis of the columnar member and including the axis. For the material of the ferrule 12, ceramics other than zirconia may be used. Alternatively, glass, metal, etc., may also be used. Further, the shape of the ferrule 12 is not limited to a columnar shape, and may be a prism shape, etc. The optical fiber 11 is inserted in the through-hole of the ferrule 12 such that one end of the optical fiber is exposed from one end 121 of the ferrule 12 and the other end side of the optical fiber is pulled out of the other end 122 of the ferrule 12.

The body sleeve 13 is a cylindrical stainless steel member having non-flexibility. For the material of the body sleeve 13, as long as the material does not have flexibility, metals other than stainless steel may be used, or ceramics or the like may also be used. A part of the ferrule 12 on the other end 122 side is inserted into one end 131 side of the body sleeve 13. In this embodiment, the inner diameter of the cylindrical member configuring the body sleeve 13 is made smaller than the outer diameter of the ferrule 12 throughout the entire cylindrical member, and the inside of the cylindrical member is subjected to cutting (stepped processing) so that only the portion of the cylindrical member on the one end 131 side where the ferrule 12 is inserted has an inner diameter substantially equal to the outer diameter of the ferrule 12. Alternatively, the inner diameter of the body sleeve 13 may be set to be substantially equal to the outer diameter of the ferrule 12 throughout the entire body sleeve 13. As described above, when the inner diameter of the body sleeve 13 is entirely made substantially equal to the outer diameter of ferrule 12 throughout the entire body sleeve 13, stepped processing of the body sleeve 13 becomes unnecessary, which in turn can reduce the thickness of the entire body sleeve 13. The optical fiber 11 extending from the other end 122 side of the ferrule 12 is arranged in the body sleeve 13 and reaches the outside of the other end 132 of the body sleeve 13. A gap is formed between the optical fiber 11 and the body sleeve 13 on the other end 132 side of the body sleeve 13 than the other end 122 of the ferrule 12. The body sleeve 13 has a higher rigidity than that of the optical fiber fixture 14

The optical fiber fixture 14 is filled in the gap between the optical fiber 11 and the body sleeve 13. With this, the optical fiber 11 is fixed to the body sleeve 13. For the optical fiber fixture 14, a solidified adhesive agent is used in this embodiment. For this adhesive agent, an adhesive agent having heat resistance to temperature in the use environment of the probe 10 for optical measurement is used. From the viewpoint of easy production, it is desirable to use an adhesive agent having low viscosity. For such an adhesive agent, a silicone based adhesive agent, such as RTV silicone rubber (KE-1308), may be suitably used. Instead of a silicone based adhesive agent, other adhesive agents, such as, e.g., epoxy based adhesive agent, may be used.

At a position of the body sleeve 13 covering a part of the other end side of the optical fiber 11, in other words, at a position of the body sleeve 13 closer to the other end 132 thereof than the other end 122 of the ferrule 12 inserted in the body sleeve 13, holes 15 are provided. In this embodiment, two holes 15 are provided, but the number of holes 15 may be one or three or more. In the same manner as in the optical fiber fixture 14, the holes 15 are filled with a solidified adhesive agent.

Next, with reference to FIG. 2A to FIG. 2D, a method for producing a probe 10 for optical measurement according to this embodiment will be described.

Figure 2A:
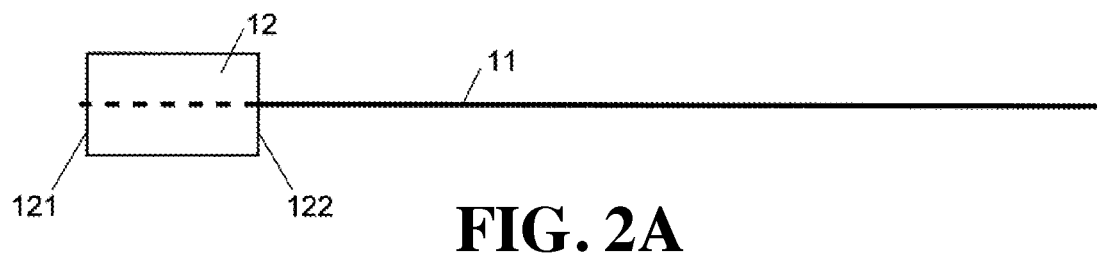
FIG. 2A to FIG. 2D are schematic views explaining a method of producing the probe for optical measurement of this embodiment.

First, a through-hole is formed in the ferrule 12 made of ceramics along the axis thereof, and the optical fiber 11 is inserted into this through-hole (FIG. 2A). At that time, the insertion operation is performed such that one end of the optical fiber 11 is exposed from one end of the ferrule 12 and the other end side of the optical fiber 11 is pulled out of the other end 122 of the ferrule 12.

Figure 2B:
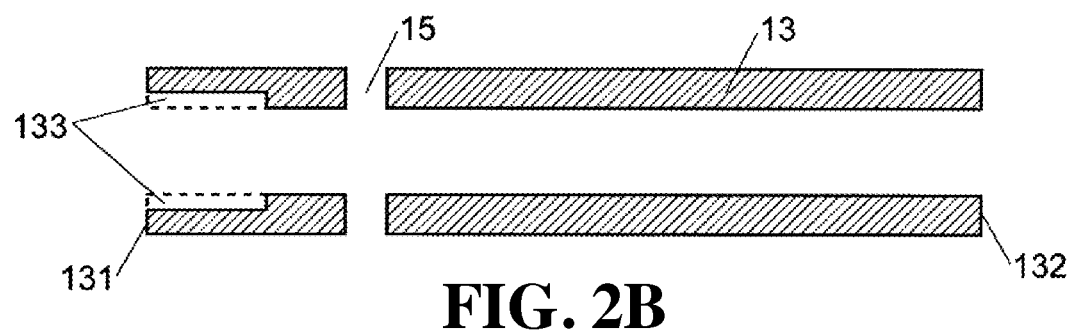

Further, holes 15 are drilled in a body sleeve 13 formed of a metal columnar member having non-flexibility. At the same time, the inner periphery of the body sleeve 13 is subjected to cutting so that the inner diameter of the body sleeve 13 on the one end 131 side becomes substantially equal to the outer diameter of the ferrule 12 to thereby form a fitting portion 133 (FIG. 2B).

Figure 2C:
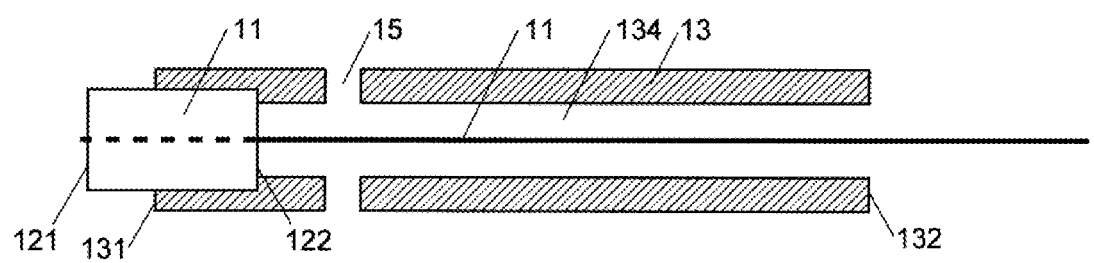

Next, the other end side of the optical fiber 11 is passed through the inside of the body sleeve 13 from the one end 131 side of the body sleeve 13, and the ferrule 12 is fitted in the fitting portion 133 of the body sleeve 13 (FIG. 2C). As a result, on the other end 132 side of the body sleeve 13 than the ferrule 12, the other end side of the optical fiber 11 is arranged in a state in which a gap 134 is provided between the other end side of the optical fiber 11 and the body sleeve 13.

Figure 2D:
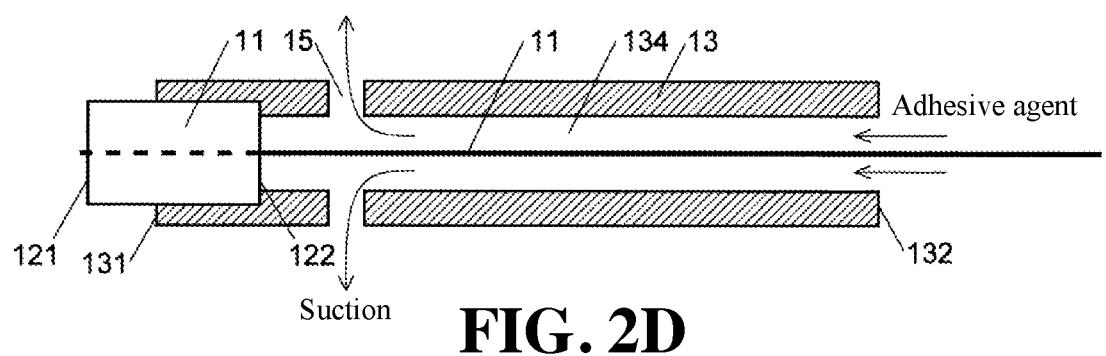

Subsequently, while supplying an adhesive agent to the gap 134 from the other end 132 side of the body sleeve 13, a gas is sucked from the holes 15 using a vacuum pump (FIG. 2D). This allows the adhesive agent to run through the gap 134 and fill the gap 134 with the adhesive agent. At that time, by using a low viscosity adhesive agent as described above, it is possible to more assuredly fill the gap 134 with the adhesive agent. The holes 15 are also filled with the adhesive agent. Thereafter, the optical fiber fixture 14 is produced by solidifying the adhesive agent filled in the gap 134. Through the above steps, the probe 10 for optical measurement of this embodiment is produced.

According to the probe for optical measurement and its production method of this embodiment, it is easy to fill the adhesive agent in the gap 134 between the optical fiber 11 and the body sleeve 13. This enables to reduce the gap 134, which in turn can reduce the diameter of the probe 10 for optical measurement.

Figure 3:
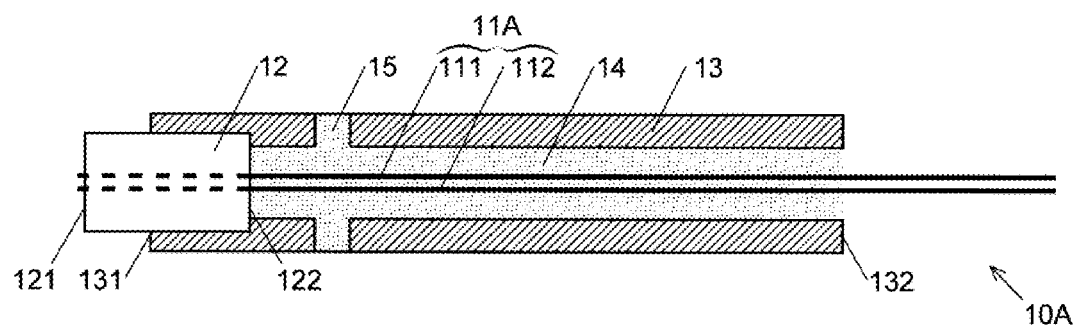
FIG. 3 is a schematic configuration view showing one modified embodiment of a probe for optical measurement according to the present invention.

FIG. 3 shows a schematic configuration view showing a probe 10A for optical measurement according to a modified embodiment of the present invention. This probe 10A for optical measurement is provided with two optical fibers, i.e., a single mode optical fiber 111 and a multimode optical fiber 112. Hereinafter, these two optical fibers are collectively referred to as "optical fiber 11A". In the same manner as in the optical fiber 11 of the probe 10 for optical measurement, the optical fiber 11A is inserted into the through-hole of the ferrule 12 such that one end thereof is exposed from the one end 121 of the ferrule 12 and the other end side thereof is pulled out of the other end 122 of the ferrule 12. Here, the ferrule 12 may be provided with a total of two through-holes for respective optical fibers, or may be provided with a single through-hole into which two optical fibers are inserted. Each component of the probe 10A for optical measurement other than the optical fiber 11A (and the ferrule 12 in the case of providing two through-holes) is the same as that of the above-described probe 10 for optical measurement.

Figure 4:
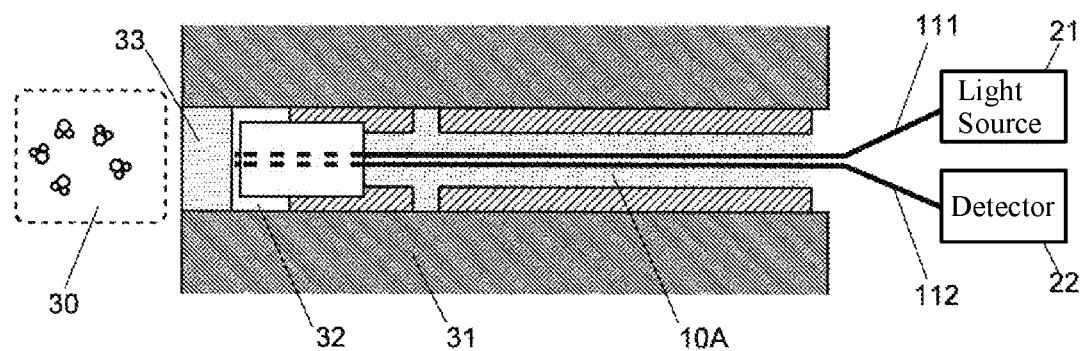
FIG. 4 is a schematic view showing an example of a mode of usage of a probe for optical measurement of a modified embodiment.

FIG. 4 shows an example of a mode of usage of the probe 10A for optical measurement of a modified embodiment. A through-hole 32 having an inner diameter substantially equal to the outer diameter of the body sleeve 13 is provided in the wall 31 of the housing body, such as an engine and an exhaust tube, in which the measurement target gas is present in the internal measurement target space 30, and an optical window 33 is provided at the opening portion on the measurement target space 30 side of the through-hole 32. The probe 10A for optical measurement is inserted into the through-hole 32 from the outside of the housing body in a state in which the one end side of the ferrule 12 and the optical fiber 11A is directed to the measurement target space 30 side. A light source 21 is connected to the other end of the single mode optical fiber 111, and a detector 22 is connected to the other end of the multimode optical fiber 112. In this embodiment, the light source 21 is a light source for generating infrared light in a wavelength band corresponding to the absorption wavelength band of the target gas included in the measurement target gas. The infrared light is irradiated to the measurement target gas in the measurement target space 30 through the single mode optical fiber 111 and the optical window 33. The detector 22 is configured to detect the intensity of the transmitted light and the reflected light for each wavelength after the measurement target gas in the measurement target space 30 absorbs the infrared light in the absorption wavelength band by the measurement target gas. The transmitted light and reflected light of the measurement target gas in the measurement target space 30 are input to the detector 22 through the optical window 33 and the multimode optical fiber 112.

In the probe 10A for optical measurement of this modified example, two optical fibers are provided, but three or more optical fibers may be provided. Thus, for example, the absorption of light at different wavelengths for each optical fiber can be measured.

Figure 5:
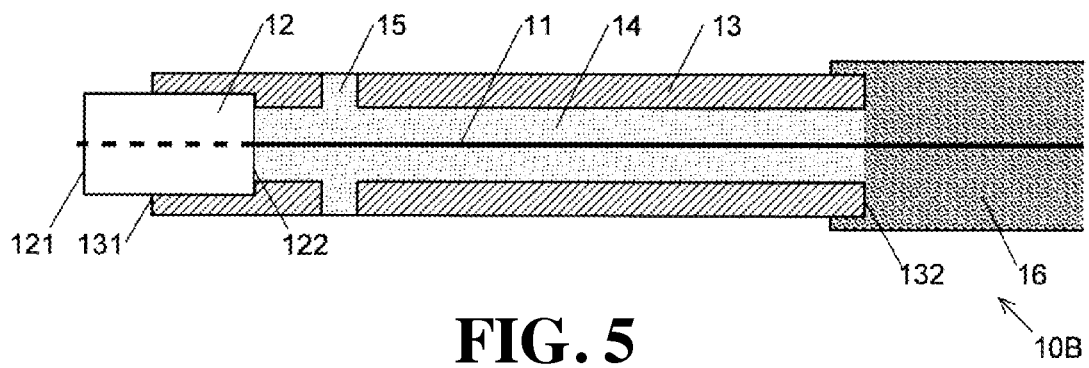
FIG. 5 is a schematic configuration view showing another modified embodiment of a probe for optical measurement according to the present invention.

FIG. 5 shows a schematic configuration view showing a probe 10B for optical measurement according to another modified embodiment of the present invention. In this probe 10B for optical measurement, the portion of the optical fiber 11 in the aforementioned probe 10 for optical measurement positioned on the other end side of the body sleeve 13, that is, the portion of the optical fiber extending outside the body sleeve 13, is covered with a synthetic resin protective tube 16 having flexibility. By using such a protective tube 16, it is possible to prevent disconnection of the optical fiber 11 due to bending at the outside of the body sleeve 13. A similar protective tube 16 may also be provided for a probe for optical measurement having two or more optical fibers such as the probe 10A for optical measurement in the aforementioned modified embodiment.

Figure 6:
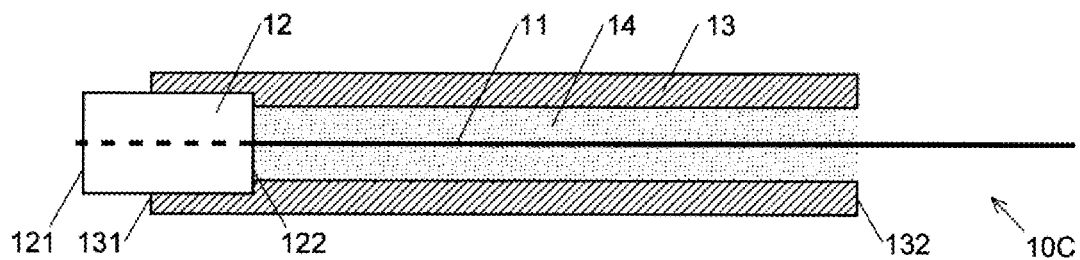
FIG. 6 is a schematic configuration view showing still another modified embodiment of a probe for optical measurement according to the present invention.

In the embodiments described above, the holes 15 are provided in the body sleeve 13. It should be noted, however, that such a hole 15 is not an essential element in the probe for optical measurement of the present invention, and such a hole can be omitted in the same manner as in the probe 10C for optical measurement shown in FIG. 6. In this case, the adhesive agent is filled into the gap 134 from the other end side of the body sleeve 13 without suctioning the gas at the time of production. In this case, it is more difficult for the adhesive agent to flow into the gap 134 as compared with the case in which a gas is suctioned, so it is preferable to use an adhesive agent having low viscosity. FIG. 6 shows the case in which only one optical fiber is arranged and there exists no protective tube 16. However, two or more optical fibers may be provided and the protective tube 16 may also be provided. [39] The present invention is not limited to the above-described embodiments, but can be appropriately modified within the scope of the gist of the present invention. For example, in the above-described embodiments, a solidified adhesive agent is used for the optical fiber fixture 14, but a material formed by solidifying a material having other fluidity may be used. As such, a material formed by solidification due to evaporation of a solvent, a material formed by solidification due to a chemical reaction between a main agent and a curing agent, a material formed by solidification due to the chemical reaction by heat or light (a thermosetting resin, a light-curable resin), etc., can be used.

DESCRIPTION OF REFERENCE SYMBOLS 10, 10A, 10B, 10C: probe for optical measurement
11, 11A: optical fiber
111: single mode optical fiber
112: multimode optical fiber
12: ferrule
121: one end of a ferrule
122: the other end of the ferrule
13: body sleeve
131: one end of a body sleeve
132: the other end of a body sleeve
133: fitting portion
134: gap
14: optical fiber fixture
15: hole
16: protective tube
21: light source
22: detector
30: measurement target space
31: wall
32: through-hole
33: optical window

The invention claimed is:

1. A method of producing a probe for optical measurement, comprising:
    providing two opposite holes in a cylindrical body sleeve having non-flexibility;
    inserting an optical fiber in a ferrule such that one end of the optical fiber is exposed from one end of the ferrule and the other end side of the optical fiber is exposed from the other end of the ferrule;
    inserting the ferrule into the body sleeve such that the body sleeve covers a part of the other end side of the optical fiber and the holes are positioned at a position which covers a part of the other end side of the optical fiber;
    filling a material in a gap between the optical fiber and the body sleeve by sucking a gas from the holes while injecting the material having fluidity from an end portion of the body sleeve on the other end side of the optical fiber; and
    solidifying the material in the gap and the holes.

2. The method of producing a probe for optical measurement as recited in claim 1,
    wherein the material is an adhesive agent.

3. The method of producing a probe for optical measurement as recited in claim 1,
    wherein the optical fiber is fixed to the body sleeve by solidifying the material in the gap.

4. The method of producing a probe for optical measurement as recited in claim 1,
    wherein the at least one optical fiber comprises a plurality of optical fibers.

5. The method of producing a probe for optical measurement as recited in claim 1, further comprising:
    covering a part of the optical fiber located closer to the other end side of the optical fiber than the body sleeve with a protective tube having flexibility.

* * * * *